US009946222B2

(12) United States Patent
Karakama et al.

(10) Patent No.: US 9,946,222 B2
(45) Date of Patent: Apr. 17, 2018

(54) AIR FLOW SENSOR AND OPTIONAL DEVICE THAT IS FOR ELECTRICAL MACHINE AND THAT INCLUDES THE AIR FLOW SENSOR

(71) Applicant: Konica Minolta, Inc., Chiyoda-ku, Tokyo (JP)

(72) Inventors: Sho Karakama, Toyokawa (JP); Katsumi Kuroyanagi, Toyokawa (JP); Shigeru Sawano, Toyokawa (JP); Isao Kawakami, Gamagori (JP); Shuan Yang, Kariya (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 233 days.

(21) Appl. No.: 15/079,270

(22) Filed: Mar. 24, 2016

(65) Prior Publication Data

US 2016/0282157 A1 Sep. 29, 2016

(30) Foreign Application Priority Data

Mar. 25, 2015 (JP) ................................ 2015-063278

(51) Int. Cl.
*G01F 1/28* (2006.01)
*G03G 21/20* (2006.01)

(52) U.S. Cl.
CPC .................................. *G03G 21/206* (2013.01)

(58) Field of Classification Search
CPC ......... G03G 21/206; G03G 21/20; G01F 1/28
USPC ........................................................ 250/573
See application file for complete search history.

(56) References Cited

U.S. PATENT DOCUMENTS 4,405,882 A * 9/1983 Reinsch .................. F21V 29/02 116/273
6,637,127 B2 * 10/2003 Reede ..................... D06F 58/22 34/140

FOREIGN PATENT DOCUMENTS

| | | | |
|---|---|---|---|
| JP | S47-031671 | U | 12/1972 |
| JP | 01-146519 | A | 6/1989 |
| JP | H06-301260 | A | 10/1994 |
| JP | H06-324543 | A | 11/1994 |
| JP | H10-281828 | A | 10/1998 |
| JP | 2007-010631 | A | 1/2007 |

OTHER PUBLICATIONS

Office Action (Notice of Reasons for Rejection) dated Oct. 3, 2017, by the Japanese Patent Office in corresponding Japanese Patent Application No. 2015-063278 and English translation of the Office Action. (6 pages).

(Continued)

*Primary Examiner* — Seung C Sohn
(74) *Attorney, Agent, or Firm* — Buchanan Ingersoll & Rooney PC

(57) ABSTRACT

An air flow sensor includes a case, a to-be-detected object, and a detector. The case includes an intake port and an exit port through which air is to flow. The to-be-detected object is located at a first position in the case when the air flowing from the intake port to the exit port has lower than a predetermined level of pressure, and is movable from the first position receiving the air when the air has equal to or higher than the predetermined level of pressure. The detector is disposed outside the case and is configured to detect a movement of the to-be-detected object and output an electrical signal.

16 Claims, 10 Drawing Sheets

(56) References Cited

OTHER PUBLICATIONS

Office Action (Notification of Reasons for Refusal) dated Feb. 21, 2017, by the Japanese Patent Office in corresponding Japanese Patent Application No. 2015-063278 and English translation of the Office Action. (6 pages).

* cited by examiner

FIG. 10A FIG. 10B
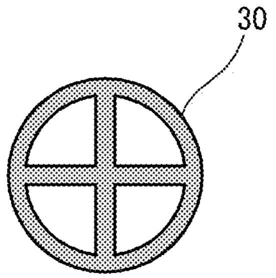
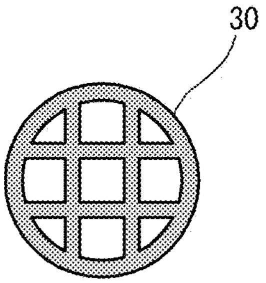
FIG. 11
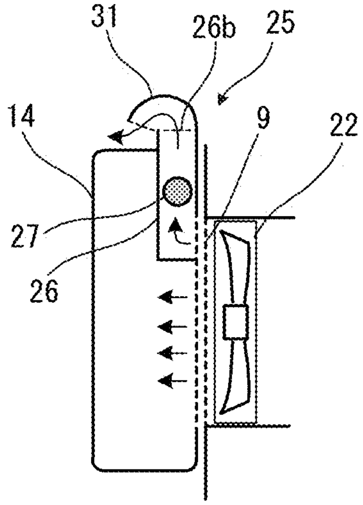

AIR FLOW SENSOR AND OPTIONAL DEVICE THAT IS FOR ELECTRICAL MACHINE AND THAT INCLUDES THE AIR FLOW SENSOR

CROSS-REFERENCE TO RELATED APPLICATIONS

The present application claims priority under 35 U.S.C. §119 to Japanese Patent Application No. 2015-63278, filed Mar. 25, 2015. The contents of this application are incorporated herein by reference in their entirety.

BACKGROUND OF THE INVENTION

Field of the Invention

The present invention relates to an air flow sensor and an optional device that is for an electrical machine and that includes the air flow sensor.

Discussion of the Background

Electrical machines such as image forming apparatuses emit exhaust gases that contain ultrafine particles (UFPs) of siloxane, which results from heating of silicon, or hydrocarbon, which results from melting of toner at high temperatures. In recent years, stricter regulations have been imposed on ultrafine particles. This requires the electrical machines to use a filter or a similar device to collect ultrafine particles in the exhaust gas and to discharge purified air to the atmosphere. Newly developed electrical machines are designed to satisfy this requirement against ultrafine particles in the exhaust gas. In order for existing electrical machines to satisfy the requirement, a discrete, optional device that has a function to purify the exhaust gas may be added to the existing electrical machines.

When an optional device is discretely mounted to an electrical machine such as an image forming apparatus, the optional device can be powered directly by a commercial power source. It is necessary, however, to electrically connect the electrical machine and the optional device to each other in order for the electrical machine to send the optional device electrical signals to control operation of the optional device.

For example, while the image forming apparatus is in waiting mode, an exhaust gas fan is out of operation or rotating at speeds so low that the amount of exhaust gas is negligibly small. Thus, the amount of ultrafine particles in the exhaust gas is negligible. While the image formation unit is in operating mode, the exhaust gas fan is rotating at full speed, emitting a larger amount of exhaust gas, which contains a larger amount of ultrafine particles. This necessitates control that includes sending the optional device an electrical signal to determine whether the image forming apparatus is in waiting mode or operating mode and making the optional device effect its air purification function while the image forming apparatus is in operating mode.

In order to implement the electrical connection between the electrical machine and the optional device, it is necessary to provide, in advance, the electrical machine with an interface (such as a connector) to make the electrical connection with the optional device possible. Providing the interface leads to an increase in cost. For an existing electrical machine without such interface, it is necessary to modify the electrical machine so as to retrieve the electrical signal and implement the electrical connection with the optional device.

In view of this situation, the inventors worked on the development of an optional device that has an air purification function and that can be discretely mountable to electrical machines while eliminating the need for electrical connection. This optional device includes an air flow sensor and a controller, The air flow sensor detects exhaust gas from the electrical machine. The controller controls the operation of the air purification function (the operation of an electric fan) based on a detection signal from the air flow sensor. That is, the optional device determines how the electrical machine is operating by detecting the exhaust gas from the electrical machine, instead of by receiving an electrical signal from the electrical machine. This enables the optional device to turn the air purification function into operation at any desirable time.

Japanese Unexamined Patent Application Publication No. 1-146519 discloses a differential pressure sensor similar to the above-described air flow sensor. The differential pressure sensor is for a vacuum cleaner. The differential pressure sensor includes a slider and a variable resistor. The slider is fitted in a cylindrical case and movable in an axis direction of the cylindrical case. The variable resistor includes a movable contactor that is movable together with the slider. When the slider is moved due to a difference between the pressure in an intake air flow path of the vacuum cleaner and the atmospheric pressure, the differential pressure sensor regards the movement of the slider as a change in resistance value of the variable resistor.

In the differential pressure sensor, it is necessary that the slider be in contact (airtight contact) with the inner surface of the cylindrical case while making a sliding movement. The necessity of contact requires high levels of accuracy in the process of making the slider and the cylindrical case. If the accuracy of the process is less than the required accuracy, it may be difficult or impossible to ensure optimum operation of the differential pressure sensor. In contrast, not as much accuracy is required of air flow sensors dedicated to detecting exhaust gas from image forming apparatuses; rather, a simple configuration costing as low as possible is preferred.

Additionally, in the above-described differential pressure sensor, a load occurs by the interfacial friction between the slider and the inner surface of the cylindrical case involved in the movement (sliding movement) of the slider. This makes the differential pressure sensor suitable for detecting air of comparatively greater force such as suction force from a vacuum cleaner and wind force from an electric blower. The differential pressure sensor, however, is difficult to use as an air flow sensor to detect air of comparatively weaker force such as the force of exhaust gas from an image forming apparatus.

It is an object of the present invention to provide an air flow sensor that deals with the above-described circumstances and to provide an optional device that is for an electrical machine and that includes the air flow sensor. Specifically, the air flow sensor has a simple configuration costing as low as possible and is suitable for detecting air (air flow) of comparatively weaker force such as the force of exhaust gas from an image forming apparatus.

SUMMARY OF THE INVENTION

According to one aspect of the present disclosure, an air flow sensor includes a case, a to-be-detected object, and a detector. The case includes an intake port and an exit port through which air is to flow. The to-be-detected object is located at a first position in the case when the air flowing from the intake port to the exit port has lower than a predetermined level of pressure, and is movable from the first position receiving the air when the air has equal to or higher than the predetermined level of pressure. The detector is disposed outside the case and is configured to detect a movement of the to-be-detected object and output an electrical signal.

According to another aspect of the present disclosure, an optional device is mountable to an electrical machine. The optional device includes an air, flow sensor, a duct, a filter, a fan, and a controller. The air flow sensor includes a case, a to-be-detected object, and a detector. The case includes an intake port and an exit port through which air is to flow. The to-be-detected object is located at a first position in the case when the air flowing from the intake port to the exit port has lower than a predetermined level of pressure, and is movable from the first position receiving the air when the air has equal to or higher than the predetermined level of pressure. The detector is disposed outside the case and is configured to detect a movement of the to-be-detected object and output an electrical signal. The filter is disposed in the duct. The fan is disposed in the duct to discharge the air to outside the duct through the filter. The controller is configured to control operation of the fan based on the electrical signal from the detector of the air flow sensor

BRIEF DESCRIPTION OF THE DRAWINGS

A more complete appreciation of the present disclosure, and many of the attendant advantages thereof will be readily obtained as the same becomes better understood by reference to the following detailed description when considered in cc ne with the accompanying drawings, wherein:

FIG. 10A is a plan view of a cross-shaped retainer disposed at or in the vicinity of the intake port and exit port of the case of the air flow sensor;

FIG. 10B is a plan view of a double-cross shaped retainer;

FIG. 11 is a side view of the air flow sensor with a windshield disposed at the exit port of the case of the air flow sensor;

DESCRIPTION OF THE EMBODIMENTS

Figure 1:
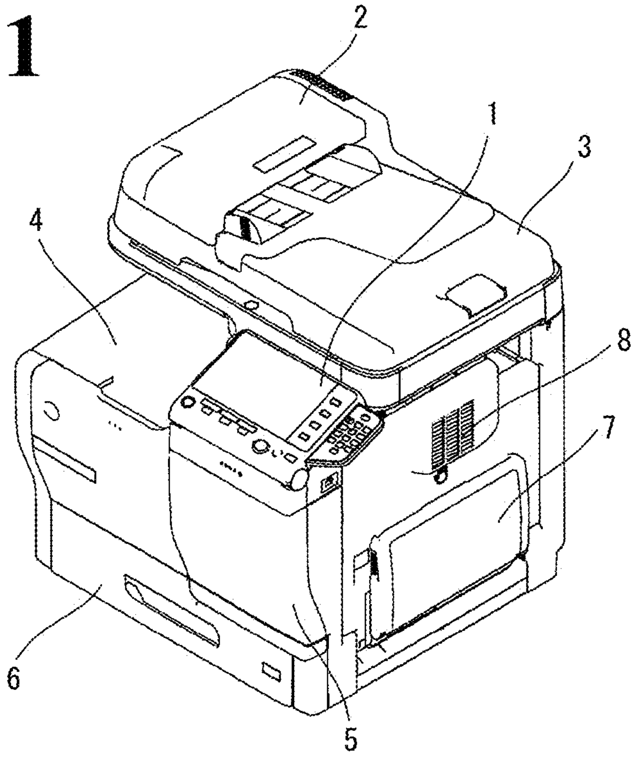
FIG. 1 is a perspective view of a multi-purpose machine according to an embodiment as seen from a forward right direction.

The embodiments will now be described with reference to the accompanying drawings, wherein like reference numerals designate corresponding or identical elements throughout the various drawings.

Figure 2:
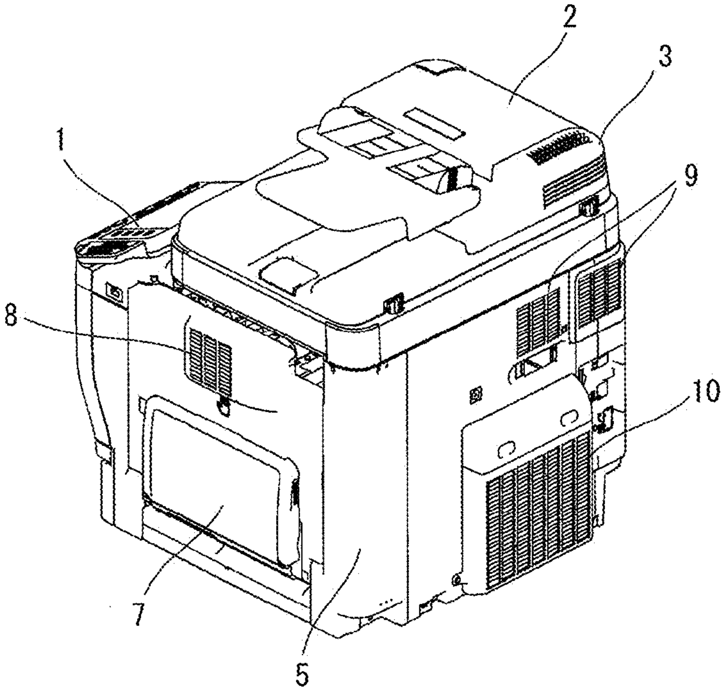
FIG. 2 is a perspective view of the multi-purpose machine according to the embodiment as seen from a rearward right direction.

FIGS. 1 and 2 are perspective views of a multi-purpose machine, which is an exemplary image forming apparatus to which the optional device according to this embodiment is discretely mounted. FIG. 1 is a perspective view of the multi-purpose machine as seen from a forward right direction, and FIG. 2 is a perspective view of the multi-purpose machine as seen from a rearward right direction. The following description, as necessary, may refer to particular directions and positions using terms such as “left and right”, “up and down (above and below or under)”, and “front and rear”. These terms are based on the front view of the image forming apparatus, which is an elevational view of the front surface, on which an operation panel 1 is disposed.

The multi-purpose machine includes the operation panel 1 and a document reader 3. The operation panel 1 is disposed at a right portion of the front surface of a body 5 of the multi-purpose machine, and includes a liquid crystal display. The document reader 3 includes an automatic document feeder (ADF) 2 on top of the body 5. Under the document reader 3 and to the left of the operation panel 1, a discharge tray 4 is disposed. On the discharge tray 4, printed sheets of paper are discharged and stacked on top of each other. In the body 5 and under the operation panel 1 and the discharge tray 4, an image formation unit is disposed, The image formation unit includes a photosensitive drum, an exposure device, a developing device, a transfer device, and a fixing device. Under the body 5, a feeding tray 6 is disposed. The feeding tray 6 accommodates recording sheets of paper of a regular size to be fed to the image formation unit.

On the right side of the body 5, a manual feeding tray 7 is disposed. In FIGS. 1 and 2, the manual feeding tray 7 is in closed, normal state. The manual feeding tray 7 is supported on the body 5 by a pivotal support shaft disposed at the lower edge of the manual feeding tray 7 and extending in frontward and rearward directions. By moving the upper edge of the manual feeding tray 7 in the right direction, the manual feeding tray 7 is turned about the pivotal support shaft into approximately horizontal orientation. When a sheet of paper is put in the manual feeding tray 7, the sheet of paper is given priority for being fed to the image formation unit. When no sheet of paper is put in the manual feeding tray 7, a sheet of paper accommodated in the feeding tray 6 is fed to the image formation unit.

A sheet of paper sent from the manual feeding tray 7 or the feeding tray 6 is fed to the image formation unit in the body 5. The multi-purpose machine has a plurality of functions, including photocopier function, scanner function, printer function, and facsimile function. For example, when the photocopier function is used, the exposure device is controlled based on image data read at the document reader 3 to form on the photosensitive drum an electrostatic latent image that is identical to the image data. Then, the developing device develops the electrostatic latent image into a toner image. The toner image is transferred onto a sheet of paper at the transfer device and fixed to the sheet of paper by heating at the fixing device. Thus, the sheet of paper fed to the image formation unit receives a toner image while the sheet of paper is being conveyed along a predetermined conveyance path. After the toner image has been fixed to the sheet of paper, the sheet of paper is discharged to the discharge tray 4.

On the right side of the body 5, a first exhaust port 8 is disposed above the manual feeding tray 7. On the inner side of the first exhaust port 8, an exhaust gas filter and an exhaust gas fan (cooling fan) are disposed. Air (cooling air) that has cooled the fixing device and other heating devices passes through the exhaust gas filter, and is discharged through the first exhaust port 8. The exhaust gas filter prevents ultrafine particles (UFPs) generated at devices such as the developing device and the fixing device from being discharged to the outside along with the cooling air. That is, a large amount of ultrafine particles contained in the cooling air is collected in the exhaust gas filter.

At an upper portion of the rear side of the body 5, two second exhaust ports 9 are disposed. The second exhaust ports 9 abut on each other in a lateral direction. On the inner sides of the second exhaust ports 9, exhaust gas fans (cooling fan) are disposed without filters. Adjacent to the second exhaust ports 9 and the exhaust gas fans, a printed circuit board is disposed. On the printed circuit board, heat dissipating components such as power transistors are mounted. Air (cooling air) that has cooled the heat dissipating components is discharged through the second exhaust ports 9. On the rear side of the body 5, an intake port 10 is disposed below the second exhaust ports 9. The body 5 has other necessary intake ports than the intake port 10, such as those on the left side of the body 5 and the bottom side of the body 5. Air is taken in through the intake ports and cools the inside of the body 5, as described above. Then, the air is discharged through the first exhaust port 8 and the second exhaust ports 9.

In recent years, especially in Europe, stricter regulations have been imposed on ultrafine particles (UFPs) contained in exhaust gas discharged from image forming apparatuses. As described above, an exhaust gas filter is disposed on the inner side of the first exhaust port 8. This exhaust gas filter, however, is a simple filter comparatively too rough in porosity to sufficiently collect the ultrafine particles contained in the exhaust gas (cooling air). Also, the second exhaust ports 9 have no filters, as described above, since the second exhaust ports 9 are exhaust ports through which to discharge cooling air for the heat dissipating components mounted on the printed circuit board. It is possible for the cooling air discharged through the second exhaust ports 9 to be contaminated with ultrafine particles contained in the cooling air from the fixing device and other heating devices.

In view of this possibility, a duct and an optional device are discretely mounted on the multi-purpose machine. The duct covers the first exhaust port 8 and the second exhaust ports 9. The optional device has an air purification function implemented by a finely porous filter and an electric fan. The optional device uses the finely porous filter to sufficiently collect the ultrafine particles contained in the exhaust gas from the first exhaust port 8 and the second exhaust ports 9, and discharges purified air out of the optional device.

Figure 3:
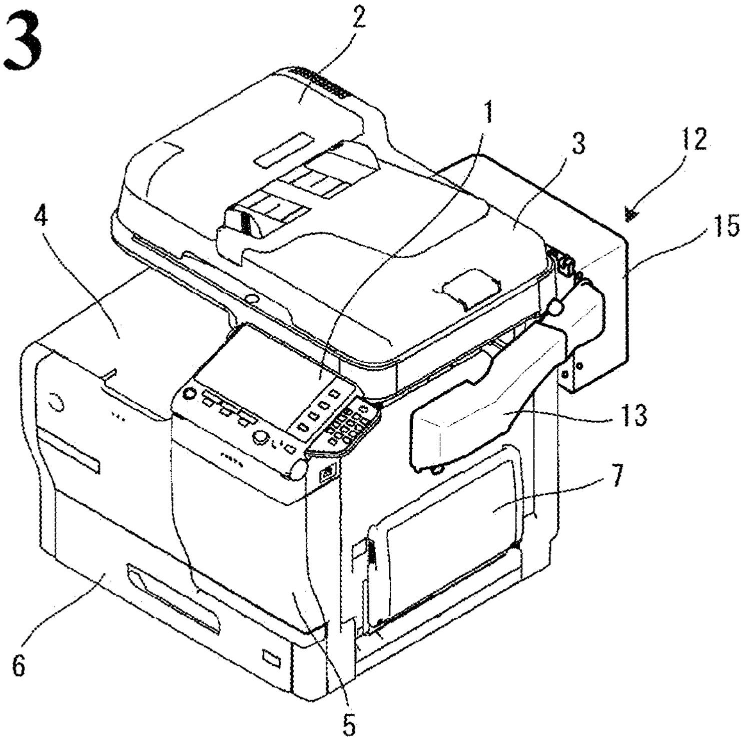
FIG. 3 is a perspective view of the multi-purpose machine as seen from the forward right direction with an optional device mounted on the multi-purpose machine.
Figure 4:
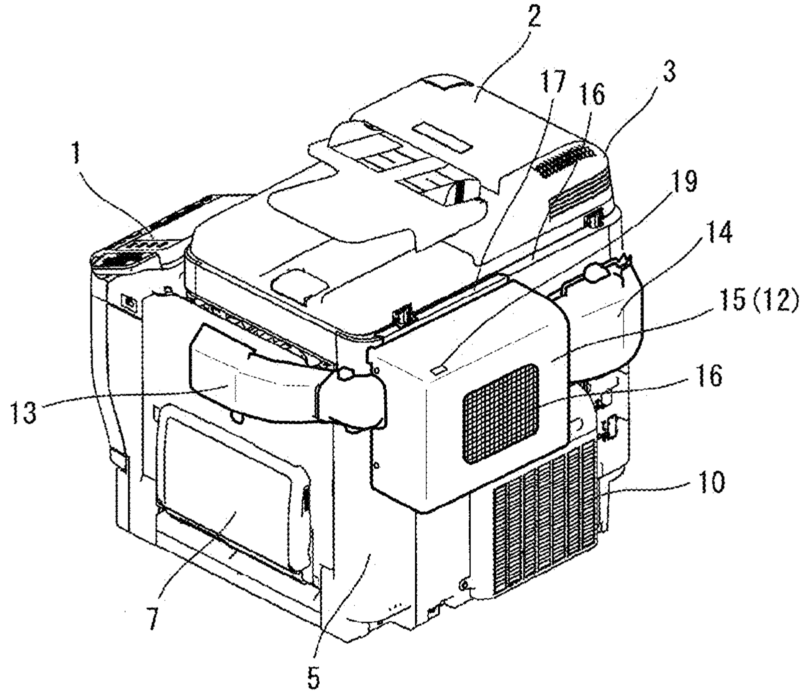
FIG. 4 is a perspective view of the multi-purpose machine as seen from the rearward right direction with the optional device mounted on the multi-purpose machine.

FIGS. 3 and 4 are perspective views of the multi-purpose machine illustrated in FIGS. 1 and 2 with an optional device 12 mounted on the multi-purpose machine. FIG. 3 is a perspective view of the multi-purpose machine as seen from a forward right direction, and FIG. 4 is a perspective view of the multi-purpose machine as seen from a rearward right direction. The optional device 12 includes a first duct 13, a second duct 14, and an air purifier (hereinafter referred to as clean unit) 15. The first duct 13 and the second duct 14 respectively collect exhaust gases from the first exhaust port 8 and the second exhaust port 9 (see FIGS. 1 and 2). The clean unit 15 includes a filter and an electric fan. The exhaust gases collected through the first duct 13 and the second duct 14 join at the clean unit 15, where the ultrafine particles in the combined exhaust gas are collected through the filter of the clean unit 15 to purify the exhaust gas. Then, the purified exhaust gas is discharged by the electric fan through an exhaust port 16, which is on the rear side of the clean unit 15.

Figure 5:
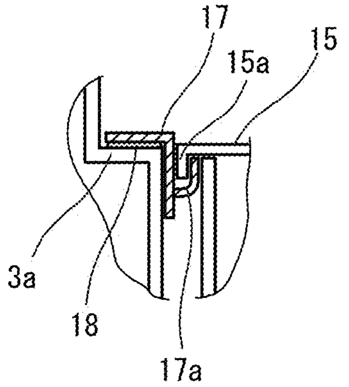
FIG. 5 is a partial cross-sectional view of the multi-purpose machine and the optional device illustrating a manner in which the optional device is mounted on the multi-purpose machine.

The clean unit 15 of the optional device 12, the first duct 13, and the second duct 14 are combined together into an assembly. Specifically, as illustrated in FIG. 5, a bracket 17 is fixed to a step 3*a* with a double-side tape. The step 3*a* is a portion of the multi-purpose machine disposed at an upper portion on the rear side of the multi-purpose machine. The clean unit 15 is fitted with the bracket 17 in such a manner that the clean unit 15 is hung on the bracket 17. Thus, the optional device 12 is mounted on the multi-purpose machine. FIG. 5 is a partial cross-sectional view of the multi-purpose machine and the optional device 12 illustrating this manner of mounting the optional device 12 to the multi-purpose machine. The bracket 17, which has an L-shaped cross-section, is fixed to the step 3*a*, which is at the upper portion on the rear side of the multi-purpose machine, with a double-side tape 18. At a plurality of positions in the longitudinal direction of the bracket 17, hooks 17*a* are formed by cutting and raising. An engagement portion 15*a* is bent downward from the top surface of the clean unit 15 and hung on the hooks 17*a*. Thus, the optional device 12 is mounted on the multi-purpose machine. The first duct 13 and the second duct 14 of the optional device 12 each have an opening (intake port for exhaust gas). The opening is surrounded by a gasket made of urethane foam resin (sponge). The gasket eliminates or minimizes a direct leakage of the exhaust gas from the first exhaust port 8 and the second exhaust ports 9 of the multi-purpose machine. On a corner portion of the top surface of the clean unit 15, an indicator (notifier) 19 is disposed (see FIG. 4). The indicator 19 is a light-emitting diode to display the operation state of the clean unit 15.

Figure 6:
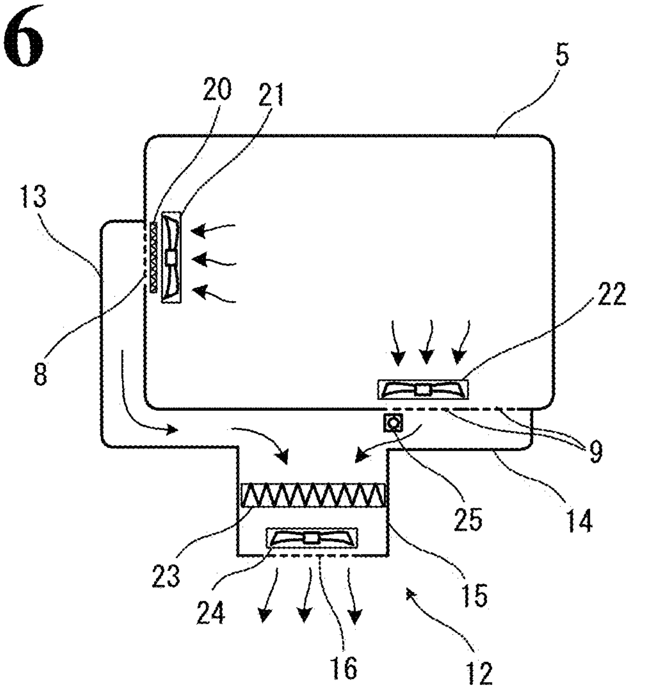
FIG. 6 is a plan view of a body of the multi-purpose machine and the optional device illustrating internal configurations of the body and the optional device.

FIG. 6 is a plan view of the body 5 of the multi-purpose machine and the optional device 12 illustrating internal configurations of the body 5 and the optional device 12. In FIG. 6 and other drawings referred to in the following description, the flow of exhaust gas, which will be referred to as air flow, is indicated by arrow-headed solid lines. The first exhaust port 8, which is disposed on the right side of the body 5 (apparently left side in FIG. 6), includes an exhaust gas filter 20 and an exhaust gas fan (cooling fan) 21 on the inner side of the first exhaust port 8. Air (cooling air) that has cooled the fixing device and other heating devices passes through the exhaust gas filter 20 and is discharged through the first exhaust port 8. The discharged air is guided through the first duct 13 of the optional device 12 into the clean unit 15. The second exhaust ports 9, which are disposed on the rear side of the body 5 (apparently lower side in FIG. 6), include an exhaust gas fan (cooling fan) 22 on the inner side of the second exhaust ports 9. Air (cooling air) that has cooled the heat dissipating components mounted on the printed circuit board is discharged through the second exhaust ports 9. The discharged air is guided through the second duct 14 of the optional device 12 into the clean unit 15.

The clean unit 15 includes a high-efficiency particle air filter (hereinafter referred to as HEPA filter) 23 and an electric fan (exhaust gas fan) 24. The HEPA filter 23 is more finely porous than the exhaust gas filter 20, which is on the inner side of the first exhaust port 8 of the body 5. The exhaust gases collected through the first duct 13 and the second duct 14 join at the clean unit 15, where the ultrafine particles in the combined exhaust gas are collected through the filter of the clean unit 15 to purify the exhaust gas. Then, the purified exhaust gas is discharged by the electric fan 24 through an exhaust port 16, which is on the rear side of the clean unit 15.

The optional device 12 includes an air flow sensor 25 and a controller. The air flow sensor 25 detects the presence or absence of the exhaust Etas flowing from the body 5 of the multi-purpose machine no as to detect the mode (waiting mode or printing mode) in which the multi-purpose machine is in. Based on a signal output from the air flow sensor 25, the controller controls the operation of the electric fan 24 (that is, the operation of the clean unit 15). Thus, without the need for electrical connection to the multi-purpose machine, the optional device 12 is capable of activating the electric fan 24 (that is, activating the air purification function of the clean unit 15) anytime a need arises in view of the operation mode of the multi-purpose machine. It is noted that the power to drive the controller and the electric fan 24 is not supplied from the multi-purpose machine but from a commercial power source (AC 100 V), which is supplied to a power source circuit of the optional device 12.

Figure 7:
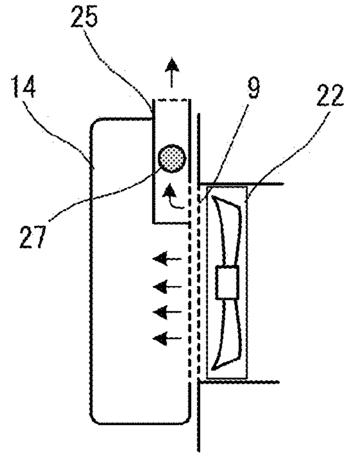
FIG. 7 is a side view of an air flow sensor of the optional device and elements around the air flow sensor.
Figure 8:
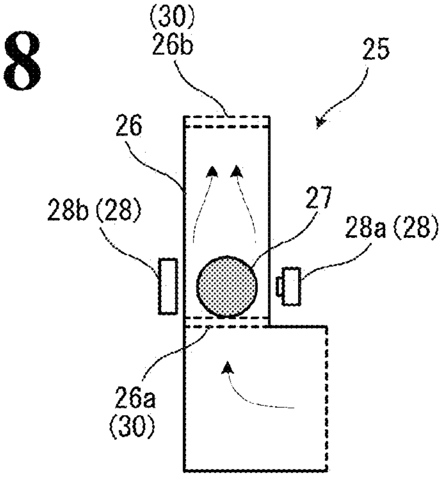
FIG. 8 is aside view of the air flow sensor illustrating an internal configuration of the air flow sensor and a detection principle.
Figure 9:
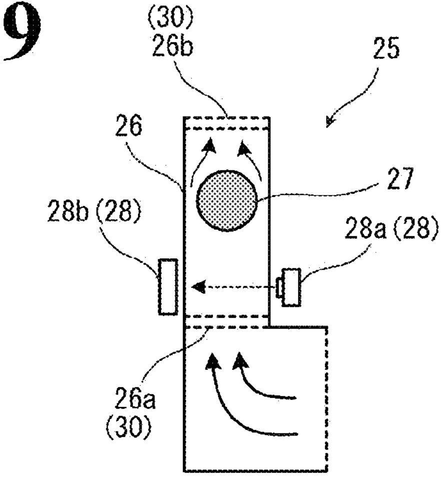
FIG. 9 is a side view of the air flow sensor illustrating an internal configuration of the air flow sensor and the detection principle.

FIG. 7 is a side view of the air flow sensor 25 and elements around the air flow sensor 25, and FIGS. 8 and 9 are side views of the air flow sensor 25 illustrating internal configurations of the air flow sensor 25 and a detection principle. The air flow sensor 25 includes a cylindrical case 26, a to-be-detected object 27, and a photosensor 28. The cylindrical case 26 takes in part of the exhaust gas that the exhaust fan (cooling fan) 22 has discharged through the exhaust port 9. Thus, the cylindrical case 26 forms an air path different from the air flow through the duct 14. The to-be-detected object 27 floats in the cylindrical case 26. The photosensor 28 serves as a detector that detects a movement of the to-be-detected object 27 and outputs an electrical signal.

The cylindrical case 26, which has a circular or rectangular cross-section, includes an intake port 26*a* and an exit port 26*b*. The intake port 26*a* is for the air flow (exhaust gas) The exit port 26*b* communicates with the atmosphere at a position outside the duct 14. On the outer surface of the cylindrical case 26 adjacent to the intake port 26*a*, the photosensor is disposed. The photosensor 28 is a transmission-type photosensor that includes a light emitter 28*a* and a light receiver 28*b*, which face each other in the radial direction of the photosensor 28 across the cylindrical case 26. The to-be-detected object 27 is a light-weight sphere made of foam material such as styrene foam. The diameter of the to-be-detected object 27 is smaller than a minimal inner diameter of the cylindrical case 26, and thus there is a gap between the to-be-detected object 27 and the cylindrical case 26 for air to flow in the gap.

When the exhaust gas (air flow) through the cylindrical case 26 has pressure lower than a predetermined level of pressure, the to-be-detected object 27 is kept at its initial position under the to-be-detected object 27's own weight. As illustrated in FIG. 8, the initial position is adjacent to the intake port 26*a* of the cylindrical case 26. While the to-be-detected object 27 is at its initial position, the light from the light emitter 28*a* of the photosensor 28 is blocked by the to-be-detected object 27 and does not reach the light receiver 28*b*. Therefore, no light detection signal is output from the light receiver 28*b*.

When the pressure of the exhaust gas (air flow) through the cylindrical case 26 becomes equal to or higher than the predetermined level of pressure, the to-be-detected object 27 is pushed (forced to float) by air flow away from the initial position, as illustrated in FIG. 9. While the to-be-detected object 27 is away from its initial position, the light from the light emitter 28*a* of the photosensor 28 is not blocked by the to-be-detected object 27 and reaches the light receiver 28*b*. Then, the light receiver 28*b* outputs a light detection signal. This configuration ensures determination making as to whether the pressure of the exhaust gas flow) is equal to or higher than the predetermined level of pressure based on the presence or absence of the light detection signal from the light receiver 28*b*.

While the multi-purpose machine is executing print processing, the exhaust fan (cooling fan) 22 is rotating at full speed. This state corresponds to the state in which the pressure of the exhaust gas (air flow) is equal to or higher than the predetermined level of pressure. While the multi-purpose machine is not executing print processing (that is, while the multi-purpose machine is in waiting mode), the exhaust fan (cooling fan) 22 is stationary or rotating at low speed. This state corresponds to the state in which the pressure of the exhaust gas (air flow) is lower than the predetermined level of pressure. Unless otherwise noted, the expression "presence or absence of the exhaust gas (air flow)" refers to a comparison between the state in which the pressure of the exhaust gas (air flow) is equal to or higher than the predetermined level of pressure and the state in which the pressure of the exhaust gas (air flow) is lower than the predetermined level of pressure.

The photosensor 28 will not be limited to a transmission-type photosensor. Another possible example of the photosensor 28 is a reflection-type photosensor. In the case of a reflection-type photosensor, its light emitter and light receiver are disposed on the same side in the radial direction outside the cylindrical case 26. When the reflection-type photosensor is adjacent to the intake port 26*a* of the cylindrical case 26 similarly to FIGS. 8 and 9, the light from the light emitter is reflected at the to-be-detected object 27 and enters the light receiver while the to-be-detected object 27 is at its initial position as illustrated in FIG. 8. Then, the light receiver outputs a light detection signal. While the to-be-detected object 27 is away from its initial position as illustrated in FIG. 9, the light from the light emitter is not reflected at the to-be-detected object 27. Therefore, no light detection signal is output from the light receiver. Thus, the obtained output has an inverse logic level relative to the output obtained from the transmission-type photosensor.

It is necessary that the cylindrical case 26 be made of light-transmittable material (such as transparent resin) at least at the portion corresponding to the optical path between the light emitter 28*a* and the light receiver 28*b* of the photosensor 28. In order to eliminate or minimize the influence (noise) that external light has on the light receiver of the photosensor 28, it is preferable that the surrounding wall of the cylindrical case 26 be entirely coated in black (or coated with a light-non-transmittable paint) and then the paint be removed only at the portion corresponding to the optical path between the light emitter 28*a* and the light receiver 28*b* of the photosensor 28, thereby making the portion a light-transmittable slit In the vicinity of the intake port 26*a* and the exit port 26*b* of the cylindrical case 26, a retainer 30 is disposed. The retainer 30 prevents the to-be-detected object 27 from going out of the cylindrical case 26. The retainer 30 also functions as a rectifier member to rectify air flow. As illustrated in FIG. 10A, the retainer 30 is a resin article made up of a frame having a circular shape in plan view and across-shaped retainer integral to the frame. The retainer 30 has a predetermined level of thickness enough to function as a rectifier member. The plane shape illustrated in FIG. 10A is not intended in a limiting sense. Another possible example is illustrated in FIG. 10B, where a double-cross shaped retainer is integral to the circular frame. Still another possible example is that a lattice-shaped retainer having a larger number of squares is integral to the circular frame. As illustrated in FIG. 11, the windshield 31 is preferably disposed in the vicinity of the exit port 26*b* of the cylindrical case 26 to prevent flow of external air into the case.

Figure 12:
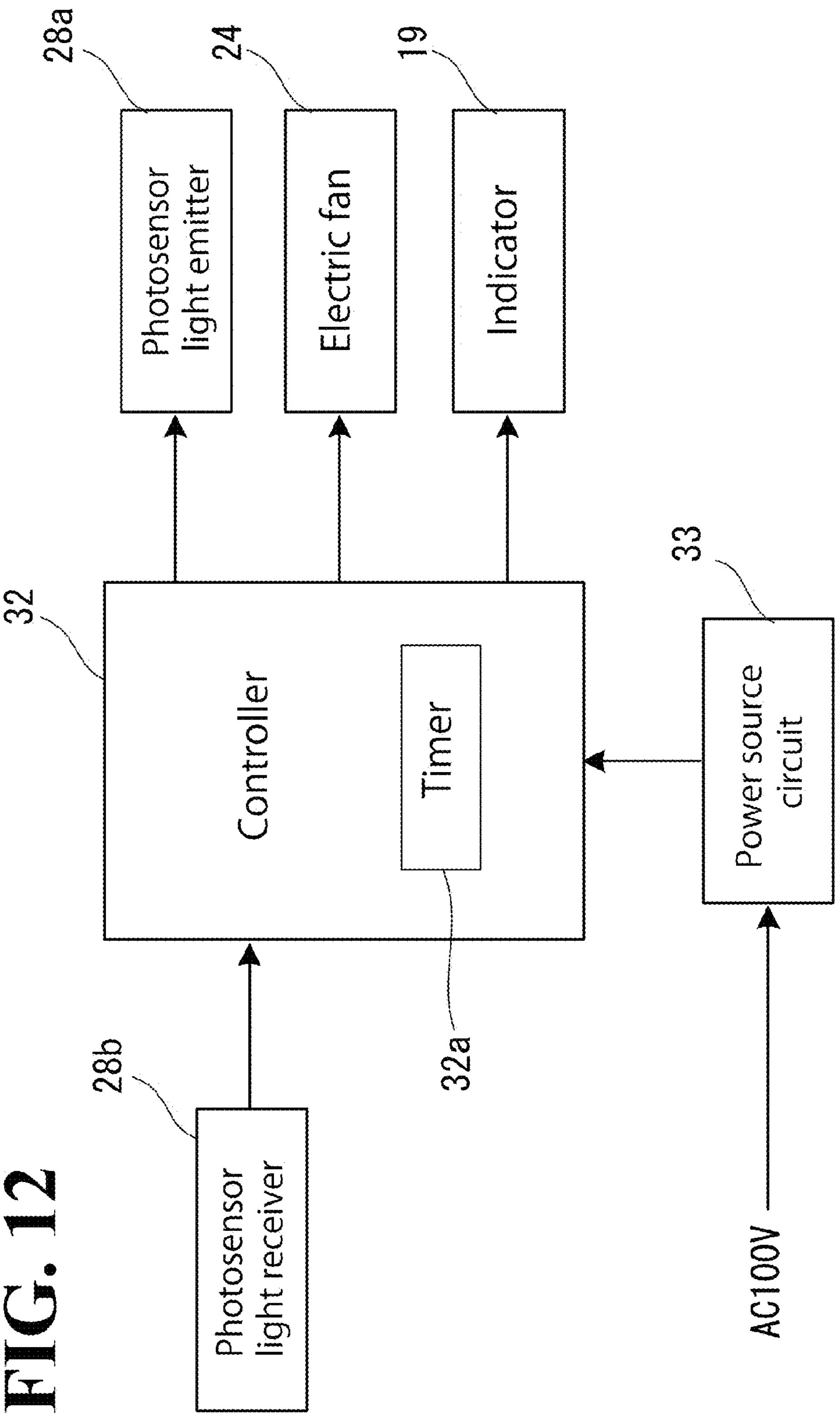
FIG. 12 is a block diagram illustrating a configuration of an electric circuit of the optional device.

FIG. 12 illustrates a configuration of the electric circuit of the optional device 12. The optional device 12 includes a controller 32. Based on the output signal (detection signal) from the light receiver 28*b* of the photosensor 28, which constitutes the air flow sensor 25, the controller 32 controls the electric fan 24 (air purifier) and the indicator 19. The controller 32 may be a micro-computer operable based on a program. Another possible example of the controller 32 is an electronic circuit made up of discrete parts. The controller 32 also includes a driving circuit for the electric fan 24, the indicator (LED) 19, and the light emitter (LED) 28*a* of the photosensor 28, and pulse-drives the indicator 19 and the light emitter (LED) 28*a* of the photosensor 28. A power source circuit 33, which is connected to the commercial power source (AC 100 V), generates voltage for operating the controller 32. The voltage includes voltage for operating the electric fan 24, the indicator 19, and the light emitter 28*a* of the photosensor 28.

Figure 13:
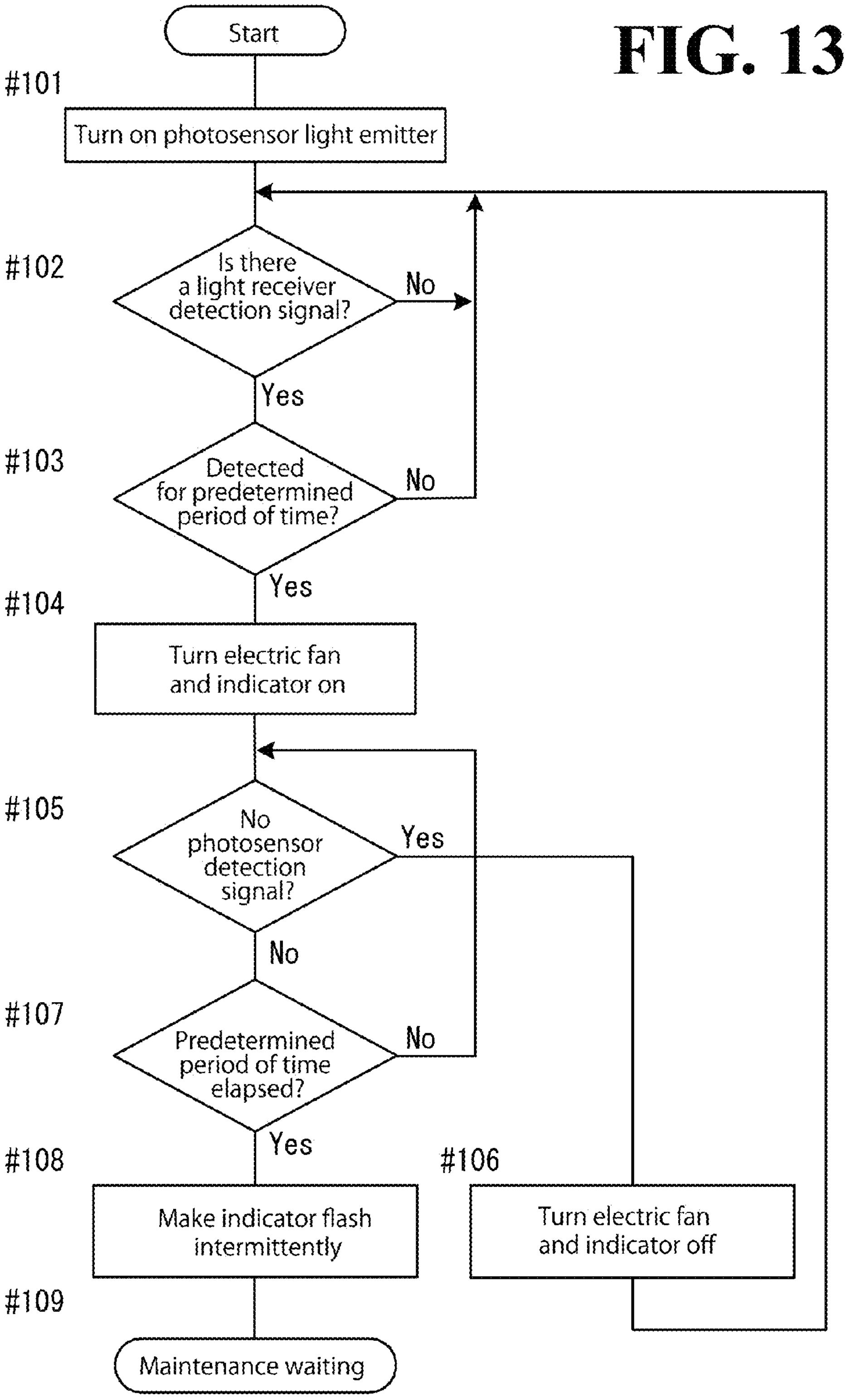
FIG. 13 is a flowchart of an example of control performed by the controller of the optional device.

FIG. 13 is a flowchart of an example of control performed by the controller 32. At step #101, the controller 32 turns on the light emitter 28*a* of the photosensor 28, and at step 4102 checks the presence or absence of a detection signal from the light receiver 28*b* of the photosensor 28 (for example, checks for high-level state). That is, the controller 32 checks the operation mode of the multi-purpose machine from the presence or absence of the exhaust gas flowing from the multi-purpose machine, and determines whether to activate the electric fan 24 (clean unit 15).

As described above, while the multi-purpose machine is executing print processing, the exhaust fan (cooling fan) 22 is rotating at full speed. While the exhaust fan (cooling fan) 22 is rotating at full speed, the to-be-detected object 27 of the air flow sensor 25 is forced to float by the pressure of the exhaust gas (air flow), allowing the light from the light emitter 28*a* of the photosensor 28 to be input into the light receiver 28*b* of the photosensor 28, instead of being blocked by the to-be-detected object 27. This state corresponds to the state in which there is a detection signal front the light receiver 28*b* of the photosensor 28. While the multi-purpose machine is not executing print processing (that is, in waiting mode), the exhaust fan (cooling fan) 22 is stationary or rotating at low speed. While the exhaust fan (cooling fan) 22 is stationary or rotating at low speed, the to-be-detected object 27 of the air flow sensor 25 is at its downward position (initial position) under the to-be-detected object 27's own weight. Thus, the light from the light emitter 28*a* of the photosensor 28 is blocked by the to-be-detected object 27 and does not reach the light receiver 28*b* of the photosensor 28. This state corresponds to the stat in which there is no detection signal from the light receiver 28*b* of the photosensor 28 (for example, low-level state). Thus, the controller 32 checks the presence or absence of the detection signal from the light receiver 28*b* of the photosensor 28 so as to determine the presence or absence of the exhaust gas flowing from the multi-purpose machine (that is, determine the operation mode of the multi-purpose machine). Based on the determination, the controller 32 controls the operation of the electric fan 24 (clean unit 15).

When there is no detection signal from the light receiver 28*b* of the photosensor 28, the processing returns to the determination at step #102. That is, the electric fan 24 and the indicator 19 are kept at off state. When there is a detection signal from the light receiver 28*b* of the photosensor 28, the processing proceeds to step #103. At step #103, the controller 32 checks whether the detection signal from the light receiver 28*b* of the photosensor 28 continues for a predetermined period of time (for example, 10 seconds). When the detection signal from the light receiver 28*b* of the photosensor 28 does not continue for the predetermined period of time, that is, when the detection signal from the light receiver 28*b* of the photosensor 28 discontinues at least once during the predetermined period of time, the processing returns to the determination at step #103 (the electric fan 24 and the indicator 19 are kept at off state). The controller 32 includes a built-in timer 32*a* (see FIG. 12). The built-in timer 32*a* measures time based on an inner clock. The controller 32 uses the built-in timer 32*a* to measure time such as the predetermined period of time.

It is when the detection signal from the light receiver 28*b* of the photosensor 28 continues for the predetermined period of time that the processing proceeds to step #104 for the first time. At step #104, the controller 32 turns the electric fan 24 and the indicator 19 on. This configuration eliminates or minimizes malfunctioning of the air flow sensor 25 that can be caused by fluctuation of the air flow, vibration of a machine or a device, external noise, and other causes. The above configuration also eliminates or minimizes chattering, which is such a phenomenon that the electric fan 24 and the indicator 19 repeat turning on and off at short intervals.

Then, at step #105, the controller 32 checks whether the detection signal from the light receiver 28*b* of the photosensor 28 has discontinued. When the multi-purpose machine ends the print processing, the rotational speed of the exhaust fan (cooling fan) 22 decreases (and becomes zero after a while). Then, the detection signal from the light receiver 28*b* of the photosensor 28 discontinues. In response, at step 4106, the controller 32 turns the electric fan 24 and the indicator 19 off so as to stop the operation of the clean unit 15. Then, the processing returns to step #102. At step #102, the above-described processing is repeated.

When at step #105 the detection signal from the light receiver 28*b* of the photosensor 28 has not discontinued yet (that is, when the detection signal continues), the processing proceeds to step #107. At step #107, the controller 32 checks whether a predetermined period of time (for example, 30 minutes) has elapsed from the start of the operation of the electric fan 24. If the operation of the electric fan 24 (the operation of the clean unit 15) continues for the predetermined period of time, this state is an abnormal state. In the abnormal state, the controller 32, at step #108, controls the indicator 19 to flash intermittently to notify the abnormal state to a user. Then, the multi-purpose machine turns into maintenance waiting mode, in which the multi-purpose machine is waiting for the user's processing such as resetting.

The indicator (LED) 19, which corresponds to the notifier, gives notification in three ways, namely, turn on (lighting), turn off (no lighting), and flash intermittently. Using the three ways, the indicator 19 enables the user to distinguish among normal operation state, stationary state, and abnormal state of the clean unit 15 (air purifier). It is possible to use any other method of distinguishably notifying the three states. For example, it is possible to use different colors of light emission such as green light for normal operation state and red light for abnormal state. The notification section may be a buzzer, which is preferable especially to notify abnormal state. It is also possible to use both the indicator (LED) and the buzzer to make the three states distinguishable.

As has been described hereinbefore, the controller 32 checks the presence or absence(checks the logic level) of the detection signal from the light receiver 28*b* of the photosensor 28, which constitutes the air flow sensor 25. In this manner, the controller 32 determines the presence or absence of the exhaust gas flowing from the multi-purpose machine (that is, determines the operation mode of the multi-purpose machine). Based on the determination, the controller 32 controls the operation of the electric fan 24 (clean unit 15). While the multi-purpose machine is executing the print processing, the exhaust fan (cooling fan) 22 is rotating at full speed and discharging exhaust gas that contains ultrafine particles. Here, the controller 32 activates the electric fan 24 (clean unit 15) based on the detection signal from the air flow sensor 25. The ultrafine particles contained in the exhaust gas is collected by the HEPA filter 23, and purified exhaust gas is discharged by the electric fan 24 from the exhaust port 16, which is on the rear surface of the electric fan 24. The electric fan 24 of the clean unit 15 rotates at a rotational speed (approximately identical air speed) that is approximately identical to the rotational speed (full rotational speed) of the exhaust gas fan 21 and the exhaust gas fan (cooling fan) 22, which is disposed in the body 5 of the multi-purpose machine.

In the example illustrated in FIG. 6, the air flow sensor 25 is arranged at the second exhaust port 9 of the multi-purpose machine (arranged adjacent to the exhaust gas fan 22). This arrangement, however, should not be construed in a limiting sense, from the viewpoint of detecting the exhaust gas from the multi-purpose machine. Another possible embodiment is that the air flow sensor 25 is arranged adjacent to the first exhaust port 8 (exhaust gas fan 21). Still another possible embodiment is that the air flow sensor 25 is arranged anywhere inside the duct 13 or 14. In view of the above-described simple structure of the air flow sensor 25 according to this embodiment, the air flow sensor 25 is preferably arranged at a position where the flow of the exhaust gas (air flow) is as strong as possible so that the air flow sensor 25 is able to accurately detect the presence or absence of the exhaust gas (detect whether the pressure of the exhaust gas is equal to or higher than the predetermined level of pressure, or lower than the predetermined level of pressure).

In this embodiment, the air flow sensor 25 is arranged adjacent to the second exhaust port 9 (exhaust gas fan as illustrated in FIG. 6. This arrangement is because on the inner side of the first exhaust port 8, there is a built-in filter of the multi-purpose machine, which makes the exhaust gas (air flow) from the first exhaust port 8 weaker than the exhaust gas (air flow) from the second exhaust ports 9. The position of the air flow sensor 25 in the direction in which the path of the air flow in the optional device 12 extends is as described above. It is equally preferable that the position of the air flow sensor 25 on a cross-section of the exhaust gas be a position at which the speed of the exhaust gas is highest (specifically, at the exhaust gas intake port of the air flow sensor 25).

Figure 14:
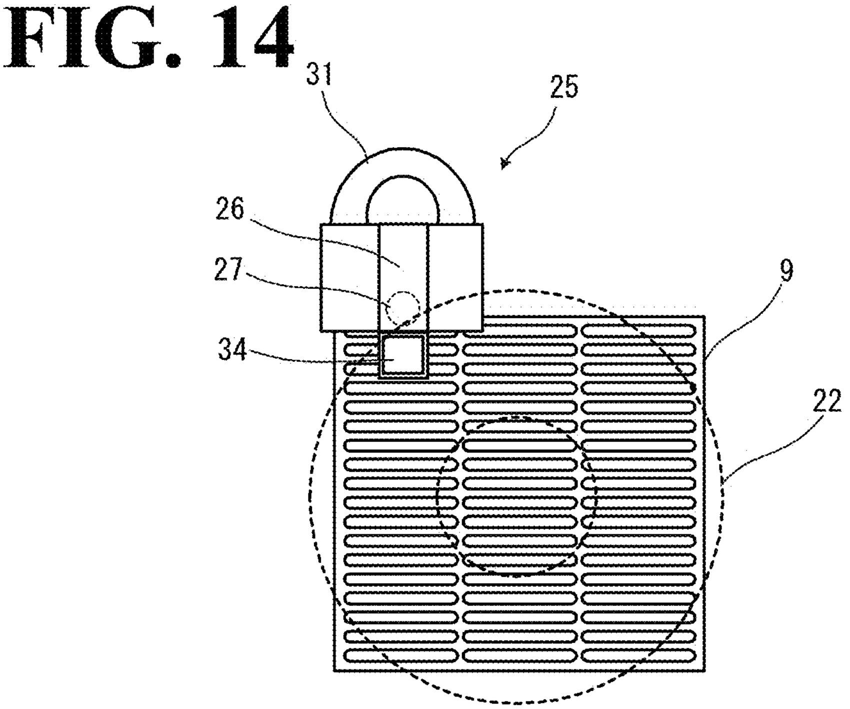
FIG. 14 is a side view of the air flow sensor illustrating the position of the air flow sensor on a cross-section of exhaust gas.

FIG. 14 is a side view of the air flow sensor 25 illustrating the position of le exhaust gas intake port 34 on a cross-section of the exhaust gas. The view of the air flow sensor 25 in FIG. 14 is from inside the optional device 12, that is, from the rear surface of the multi-purpose machine. As illustrated in FIG. 14, the exhaust gas intake port 34, which is for the exhaust gas, of the air flow sensor 25 is disposed adjacent to the left upper corner of the second exhaust port 9. Behind the second exhaust port 9 the exhaust fan 22, which is an axial flow fan, is disposed (in the body 5 of the multi-purpose machine). Generally, the strength of air flow (wind) from an axial flow fan is lower at portions closer to the center of a cross-section of the air flow and is higher at surrounding portions farther away from the center. Further, the strength of air flow (exhaust gas speed) varies even among the surrounding portions depending on situations such as the arrangement of elements in the vicinity of the exhaust fan 22. In this embodiment, the strength of air flow (exhaust gas speed) is highest at the left upper corner of the exhaust fan 22 (second exhaust port 9). In view of this, the exhaust gas intake port 34 of the air flow sensor 25 for the exhaust gas is disposed adjacent to the left upper corner of the second exhaust port 9.

Figure 15:
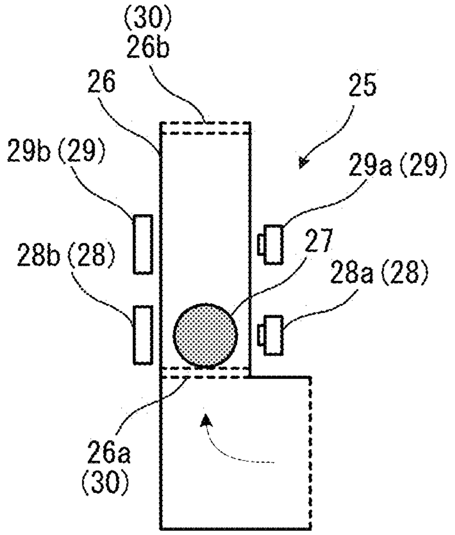
FIG. 15 is a side view of an air flow sensor according to another embodiment.

The air flow sensor 25 according to this embodiment uses one photosensor 28 to make a binary detection of whether the to-be-detected object 27 is at its initial position or not, that is, whether the pressure of the air flow is lower than the predetermined level of pressure or not. A possible modification is that the air flow sensor 25 uses a plurality of photosensors to detect the air flow on a multi-valued basis. FIG. 15 is a side view of the air flow sensor 25 according to this modification.

The air flow sensor 25 illustrated in FIG. 15 includes a first photosensor 28 (light emitter 28*a* and light receiver 28*b*) and a second photosensor 29 (light emitter 29*a* and light receiver 29*b*). The second photosensor 29 is disposed above the first photosensor 28. A predetermined gap is left between the first photosensor 28 and the second photosensor 29. Then, by a combination of a detection signal from the light receiver 28*b* of the first photosensor 28 and a detection signal from the light receiver 29*b* of the second photosensor 29, the exhaust gas can be distinguished in three stages: "no exhaust gas", "weak exhaust gas", and "strong exhaust gas". That is, "no exhaust gas" is a determination made when there is no detection signal from the light receiver 28*b* of the first photosensor 28, "weak exhaust gas" is a determination made when there is no detection signal from the light receiver 29*b* of the second photosensor 29, and "strong exhaust gas" is a determination made when there are detection signals both from the light receiver 28*b* of the first photosensor 28 and the light receiver 29*b* of the second photosensor 29. These determinations are made by a controller 32. Based on the determinations, the electric fan 24 of the clean unit 15 of the optional device 12 can be controlled in three stages: "no rotation", "slow rotation", and "fast rotation".

Figure 16:
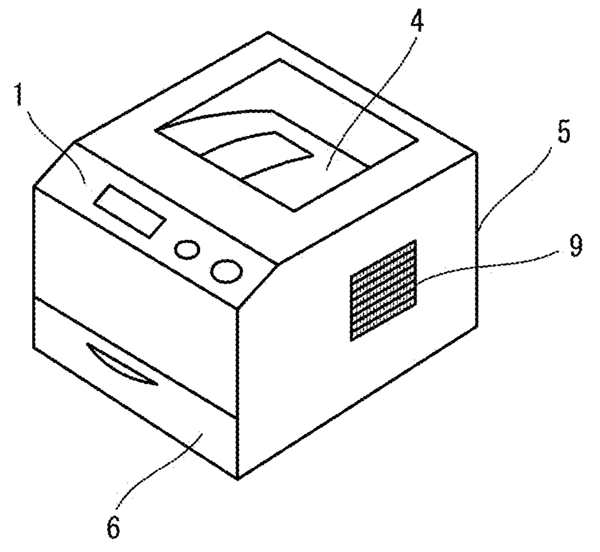
FIG. 16 a perspective view of a typical laser printer.

In this embodiment, the optional device 12, which includes the air flow sensor 25 according to this embodiment, is mounted on the multi-purpose machine, which includes the plurality of exhaust ports 8 and 9. This embodiment, however, should not be construed in a limiting sense. Another possible embodiment is illustrated in FIG. 16, where an optional device including the air flow sensor is mounted on a typical laser printer. The laser printer includes an operation panel 1 and a discharge tray 4. The operation panel 1 is disposed at an upper portion of the front surface of the laser printer, and includes a liquid crystal display and operation buttons. The discharge tray 4 is disposed on the upper surface of the laser printer behind the operation panel 1. In a body 5 of the laser printer, an image formation unit is disposed. The image formation unit includes a photosensitive drum, an exposure device, a developing device, a transfer device, and a fixing device. Under the body 5, a feeding tray 6 is disposed. The feeding tray 6 accommodates recording sheets of paper of a regular size to be fed to the image formation unit. Throughout FIGS. 1 and 2, which illustrate the multi-purpose machine, and FIG. 16, like reference numerals designate corresponding or identical elements.

Figure 17:
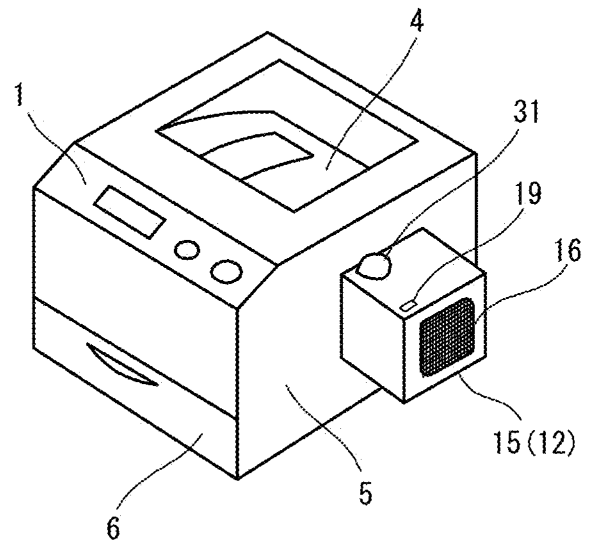
FIG. 17 is a perspective view of the laser printer illustrated in FIG. 16 with an optional device according to another embodiment mounted on the laser printer.
Figure 18:
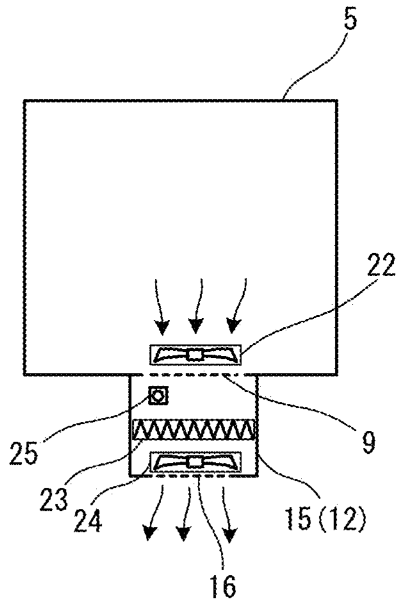
FIG. 18 is a plan view of the optional device according to the another embodiment and a body of the laser printer illustrating internal configurations of the optional device and the body.

FIG. 17 is a perspective view of the laser printer illustrated in FIG. 16 with an optional device 12 according to the another embodiment mounted on the laser printer. FIG. 18 is a plan view of the optional device 12 and the body of the laser printer illustrating internal configurations of the optional device 12 and the body. Throughout FIGS. 17 and 18 and other drawings illustrating the above-described embodiment, like reference numerals designate corresponding or identical elements, and those elements already described above will not be elaborated here.

In the laser printer illustrated in FIG. 16, an exhaust port 9 is disposed on the right side of the body 5, and an intake port (not illustrated) is disposed on the left side of the body 5. On the inner side of the exhaust port 9, an exhaust gas fan (cooling fan) 22 is disposed. The optional device 12 illustrated in FIGS. 17 and 18 includes a box-shaped clean unit 15. The clean unit 15 is disposed outside and in close proximity to the exhaust port 9 of the body 5 of the laser printer in such a manner that the clean unit 15 covers the exhaust port 9. Thus, there is no duct to guide the exhaust gas from the exhaust port through to the clean unit 15, as in the above-described embodiment. It should be noted, however, that the box-shaped exterior of the clean unit 15 functions as a duct to guide the exhaust gas from the exhaust port 9 of the body 5 of the laser printer through to the HEPA filter 23.

As seen from FIG. 18, an exhaust gas fan 22, which is on the inner side of the exhaust port 9 of the body 5 of the laser printer, is aligned with an electric fan 24 of the clean unit 15 on approximately the same axis line. Between the exhaust gas fan 22 and the electric fan 24, an air flow sensor 25 and a HEPA filter 23 of the optional device 12 (clean unit 15) are disposed. The air flow sensor 25 and the HEPA filter 23 are respectively similar to the air flow sensor 25 and the HEPA filter 23 according to the above-described embodiment, and arranged in a manner similar to the manner in which the air flow sensor 25 and the HEPA filter 23 according to the above-described embodiment are arranged. The optional device 12 according to the another embodiment provides similar operations and advantageous effects to the operations and advantageous effects provided by the optional device 12 according to the above-described embodiment.

In another embodiment, when pressure of the air becomes equal to or higher than the predetermined level of pressure, the to-be-detected object may be configured to move from the first position. When the pressure of the air becomes lower than the predetermined level of pressure, the to-be-detected object may be configured to return to the first position under the to-be-detected object's own weight.

In another embodiment, the to-be-detected object may be a light-weight sphere, and a diameter of the light-weight sphere may be smaller than an inner diameter of the case, with a gap left between the to-be-detected object and an inner wall of the case for air to flow in the gap.

In another embodiment, the air flow sensor may further include a first retainer and a second retainer. The first retainer is disposed in a vicinity of the intake port of the case to prevent the to-be-detected object from going out of the case through the intake port. The second retainer is disposed in a vicinity of the exit port of the case to prevent the to-be-detected object from going out of the case through the exit port. The retainer may include a rectifier member configured to rectify a flow of the air.

In another embodiment, the to-be-detected object may be an article made of a foam material. In another embodiment, the to-be-detected object may be spherical article.

In another embodiment, the air flow sensor may further include a windshield disposed in a vicinity of the exit port of the case to prevent inflow of external air into the case.

In another embodiment, the detector may be a photosensor, and the case may include a light-transmittable portion corresponding to an optical path between a light emitting side and a light receiving side of the photosensor. When the case is made of transparent resin, an example preferable in preventing noise is that the case is painted black while leaving an unpainted slit portion corresponding to the optical path. The photosensor may be a transmission-type photosensor or a reflection-type photosensor.

In another embodiment, the detector may be disposed at a position that is outside the case and that corresponds to the first position of the to-be-detected object.

In another embodiment, the electrical machine may include an exhaust port and an exhaust gas fan. The exhaust gas fan may be configured to discharge air to outside the electrical machine through the exhaust port. The optional device may be mountable to the air exhaust port of the electrical machine.

Obviously, numerous modifications and variations of the present invention are possible in light of the above teachings. It is therefore to be understood that within the scope of the appended claims, the present invention may be practiced otherwise than as specifically described herein.

What is claimed as new and desired to be secured by Letters Patent of the United States is:

1. An air flow sensor comprising:
- a case comprising an intake port and an exit port through which air is to flow;
- a to-be-detected object that is located at a first position in the case when the air flowing from the intake port to the exit port has lower than a predetermined level of pressure and that is movable from the first position receiving the air when the air has equal to or higher than the predetermined level of pressure; and
- a detector disposed outside the case and configured to detect a movement of the to-be-detected object and output an electrical signal.

2. The air flow sensor according to claim 1,
- wherein when pressure of the air becomes equal to or higher than the predetermined level of pressure, the to-be-detected object is configured to move from the first position, and wherein when the pressure of the air becomes lower than the predetermined level of pressure, the to-be-detected object is configured to return to the first position under the to-be-detected object's own weight.

3. The air flow sensor according to claim 2, wherein the to-be-detected object comprises a light-weight sphere, and wherein a diameter of the light-weight sphere is smaller than an inner diameter of the case, with a gap left between the to-be-detected object and an inner wall of the case for air to flow in the gap.

4. The air flow sensor according to claim 2, further comprising:

a first retainer disposed in a vicinity of the intake port of the case to prevent the to-be-detected object from going out of the case through the intake port; and a second retainer disposed in a vicinity of the exit port of the case to prevent the to-be-detected object from going out of the case through the exit port, wherein the retainer comprises a rectifier member configured to rectify a flow of the air.

5. The air flow sensor according to claim 2, wherein the to-be-detected object comprises an article comprising a foam material.

6. The air flow sensor according to claim 2, further comprising a windshield disposed in a vicinity of the exit port of the case to prevent inflow of external air into the case.

7. The air flow sensor according to claim 2, wherein the detector comprises a photosensor, and wherein the case comprises a light-transmittable portion corresponding to an optical path between a light emitting side and a light receiving side of the photosensor.

8. The air flow sensor according to claim 2, wherein the detector is disposed at a position outside the case and corresponding to the first position of the to-be-detected object.

9. The air flow sensor according to claim 1, wherein the to-be-detected object comprises a light-weight sphere, and wherein a diameter of the light-weight sphere is smaller than an inner diameter of the case, with a gap left between the to-be-detected object and an inner wall of the case for air to flow in the gap.

10. The air flow sensor according to claim further comprising:

a first retainer disposed in a vicinity of the intake port of the case to prevent the to-be-detected object from going out of the case through the intake port; and a second retainer disposed in a vicinity of the exit port of the case to prevent t e to-be-detected object from going out of the case through the exit port, wherein the retainer comprises a rectifier member configured to rectify a flow of the air.

11. The air flow sensor according to claim 1, wherein the to-be-detected object comprises an article comprising a foam material.

12. The air flow sensor according to claim 1, further comprising a windshield disposed in a vicinity of the exit port of the case to prevent inflow of external air into the case.

13. The air flow sensor according to claim 1, wherein the detector comprises a photosensor, and wherein the case comprises a light-transmittable portion corresponding to an optical path between a light emitting side and a light receiving side of the photosensor.

14. The air flow sensor according to claim 1, wherein the detector is disposed at a position that is outside the case and that corresponds to the first position of the to-be-detected object.

15. An optional device mountable to an electrical machine, the optional device comprising:

an air flow sensor comprising:

a case comprising an intake port and an exit port through which air is to flow;

a to-be-detected object that is located at a first position in the case when the air flowing from the intake port to the exit port has lower than a predetermined level of pressure and that is movable from the first position receiving the air when the air has equal to or higher than the predetermined level of pressure; and a detector disposed outside the case and configured to detect a movement of the to-be-detected object and output an electrical signal;

a duct;

a filter disposed in the duct;

a fan disposed in the duct to discharge the air to outside the duct through the filter; and a controller configured to control an operation of the fan based on the electrical signal from the detector of the air flow sensor.

16. The optional device according to claim 15, wherein the electrical machine comprises an exhaust port, and an exhaust gas fan configured to discharge air to outside the electrical machine through the exhaust port, and wherein the optional device is mountable to the air exhaust port of the electrical machine.

* * * * *